United States Patent [19]
Oh et al.

[11] Patent Number: 5,942,296
[45] Date of Patent: Aug. 24, 1999

[54] OPTICAL FIBER PREFORM

[75] Inventors: Seung-Hun Oh; Gyun-Hae Doh; Sun-Woong Kang, all of Goomi City, Rep. of Korea

[73] Assignee: SamSung Electronics Co., Ltd., Kyungki-do, Rep. of Korea

[21] Appl. No.: 08/796,192

[22] Filed: Feb. 7, 1997

Related U.S. Application Data

[62] Division of application No. 08/541,555, Oct. 10, 1995.

[30] Foreign Application Priority Data

Oct. 10, 1995 [KR] Rep. of Korea ................ 25705/1994

[51] Int. Cl.$^6$ .............................. A47G 19/22; G02B 6/02; B32B 7/02; B32B 9/00
[52] U.S. Cl. .................. 428/34.6; 428/34.4; 428/34.5; 428/428; 428/212; 385/124; 385/127
[58] Field of Search .................. 428/428, 34.4, 428/34.5, 34.6, 212; 65/385, 434, 476, DIG. 8, 412, 417, 418, 419; 385/123, 126, 141, 142, 144, 124, 127

[56] References Cited

U.S. PATENT DOCUMENTS

| | | | |
|---|---|---|---|
| 4,165,915 | 8/1979 | Rau et al. | 350/96.34 |
| 4,772,303 | 9/1988 | Kamiya et al. | 65/3.12 |
| 4,978,377 | 12/1990 | Brehm | 6/412 |

FOREIGN PATENT DOCUMENTS

| | | |
|---|---|---|
| 59-92937 | 5/1984 | Japan . |
| 2032911 | 5/1980 | United Kingdom . |

OTHER PUBLICATIONS

Optical Fiber Communication, Feb. 20–25, 1994 vol. 4, 1994 Technical Digest Series, Conference Edition.
*Heat Transfer*, Seventh Edition in Si Units by J.P. Holman, McGraw–Hill Book Company. (pp. 151–155).

*Primary Examiner*—Ellis Robinson
*Assistant Examiner*—Jennifer M. Hayes
*Attorney, Agent, or Firm*—Robert E. Bushnell, Esq.

[57] ABSTRACT

Disclosed is an optical fiber possible to prevent it from increasing an optical loss occurring during fabrication of a single mode fiber preform and extraction thereof and enhance an optical transmission efficiency, a method of producing the same comprising the steps of forming a first quartz tube having a first thermal conductivity, said first quartz tube being used as a clad; depositing a core layer and a clad layer inside said first quartz tube to form a preliminary perform by heating of said fist quartz tube; forming a second quartz tube having a second thermal conductivity lower than said first thermal conductivity; and depositing said second quartz tube to said preliminary preform by heating to produce said optical fiber preform.

21 Claims, 6 Drawing Sheets

OPTICAL FIBER PREFORM

This is a division of application Ser. No. 08/541,555, filed Oct. 10, 1995.

CROSS REFERENCE TO RELATED APPLICATIONS

This application makes reference to, incorporates the same herein, and claims all benefits accruing under 35 U.S.C §119 from an application entitled Optical Fiber Preform And Method For Producing The Same earlier filed in the Korean Industrial Property Office on Oct. 7, 1994, which was duly assigned Ser. No. 25705/1994 by that Office.

FIELD OF THE INVENTION

The present invention relates to an optical fiber and, more particularly, to an optical fiber preform possible to prevent it from increase in an optical loss occurring during fabrication of a single mode fiber preform and extraction thereof and enhance an optical transmission efficiency, and a method of producing the same.

BACKGROUND OF THE INVENTION

Optical fiber, as well-known in the art, is broadly classified into three types, the oldest and least expensive is a step-index fiber made from a higher index rod of glass surrounded by a lower index glass coating, the second oldest and most costly is a graded-index mode fiber having a core made from many layers of glass wherein the core will have an inconsistently distributed refractive index, and the newest is an optical fiber having a core of a uniform refractive index known as a single-mode fiber. The single-mode fiber is actually a step-index fiber which was pulled to a very thin core diameter. The step-index and graded-index fibers carry thousands of optical modes and are called multimode (MM) fibers, and are mainly used for a middle-distance communication or a short-distance communication. The single-mode fiber carries only the lowest order mode and is used for long-distance communication.

To produce single mode or multi-mode fiber preform, there are three methods, a outside vapor deposition (OVD), ie. outside vapor phase oxidation (OVPO), a vapor phase axial to deposition (VAD) and a modified chemical vapor deposition (MCVD). The MCVD method has some advantages over the others, wherein few impurity materials are introduced because the method is performed in a sealed tube, and a precise distribution of refractive index can be easily controlled because very thin glass films are deposited with each other. Accordingly, of the above described methods, the MCVD method is used more than 60% of the time.

SUMMARY OF THE INVENTION

It is an object of the present invention to provide an optical fiber preform and a method of producing the same with a single-mode optical fiber having good optical transmission efficiency.

It is another object of the present invention to provide an optical fiber preform and a method of producing a single-mode optical fiber exhibiting with decreased Rayleigh scattering loss.

According to one aspect of the present invention, the method of producing an optical fiber preform entails the steps of forming a first quartz tube having a first thermal conductivity, the first quartz tube being used as a clad. A core layer and a clad layer are deposited inside the first quartz tube to form a preliminary perform by heating of the first quartz tube. A second quartz tube is formed with a second thermal conductivity lower than the first thermal conductivity. The second quartz tube is jacketed to the preliminary preform by heating in order to produce the optical fiber preform.

According to another aspect of the present invention, an optical fiber preform is constructed with a core and a clad surrounding the core. The clad close to the central axis of the optical fiber preform has the highest thermal conductivity, and the thermal conductivity is gradually lowered having a gradient from the central axis to an outside circumference of the preform.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
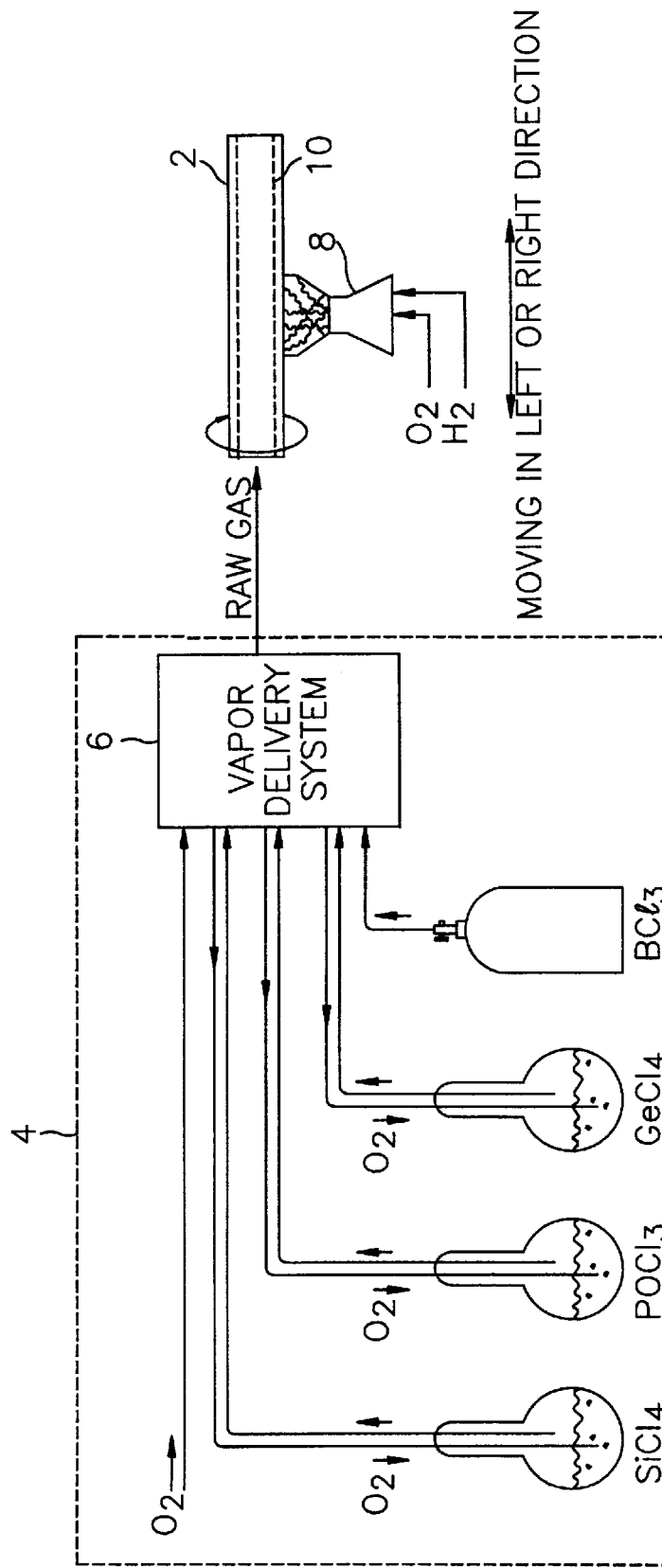
FIG. 1 is a schematic diagram showing process steps of fabricating an optical fiber preform in accordance with a conventional modified chemical vapor deposition method.

Referring to FIG. 1, the modified chemical vapor deposition technique for producing an optical fiber preform has a previously produced substrate tube 2 (hereinafter, referred to as "a first substrate tube") established on a glass plate, and then tube 2 is rotated in the direction indicated by a rotation arrow. Tube 2 constitutes an optical fiber clad. Also, a transparent quartz glass is mainly used as tube 2, and an inner diameter of tube 2 is about 26 mm. Gas supplying system 4 introduces raw gases such as tetrachlorosilane $SiCl_4$, phosphorus oxychloride $POCl_3$, boron tetrachloride $BCl_3$, and germanium dioxide $GeCl_4$, and oxygen $O_2$ into tube 2 by way of a vapor delivery system 6. Tube 2 is heated by a heating burner 8 using oxygen $O_2$ and hydrogen $H_2$ gases as a burning material. The heating burner 8 is moved to back and forth along tube 2 on the basis of control of a driving system for moving the heating burner so as to indiscriminately heat tube 2. As a result, particles of a chemical gas are formed in tube 2 and immediately vacuum-deposited on the inner wall of tube 2. By this vacuum-deposition, a deposited glass 10 is formed inside tube 2, as shown by a dotted line in FIG. 1. The deposited glass 10 is constituted by a clad layer and a core layer. With the vacuum-deposition, the clad layer having a constant thickness is previously deposited in tube 2 and the core layer, having a high refractive index, is deposited therein. The clad layer is provided to prevent hydroxyl and metal impurity ions in tube 2 from being diffused into the core layer due to the high temperature applied during the vacuum-deposition. If the hydroxyl and metal impurity ions are diffused into the core layer, the optical fiber having such a core layer has an undesired absorption loss of a light.

Next, after formation of the first substrate tube 2 having the deposited glass 10, vapor delivery system 6 stops delivering the raw material gases to tube 2, and then the tube 2 is continuously heated by supplying burner 8 with dichloride $Cl_2$ and oxygen $O_2$ or helium He. As a result, the empty core space in tube 2 is gradually reduced by thermal compression or shrinkage of the tube until there is no empty space remaining in tube 2 thus forming an optical fiber preform. Hereinafter, the optical fiber preform fabricated by the MCVD method is referred to as "a first optical fiber preform" when discussing the present invention.

The preform formed from tube 2 has an increased volume, thus an extraction length of the optical fiber becomes longer. Accordingly, total production time of the optical fiber is shortened thus contributing to improved mass production of the optical fiber.

As a well-known method for expanding the diameter of an optical fiber preform, there is a method that over-cladding (or over jacket) of a first optical fiber preform produced by the MCVD method is performed. This method is particularly disclosed in the application of Korean Pat. Serial No. 25712, filed in 1993 to the same applicant which was filed as U.S. patent application Ser. No. 08/292,977 on Aug. 22, 1994. When over-cladding the optical fiber preform, a designer has to determine the thickness of a core at an appropriate ratio in consideration of thickness of a clad of the optical fiber preform and thickness of a clad of over cladding. The over-cladding method of the optical fiber preform will be briefly described hereinafter.

Figure 2A:
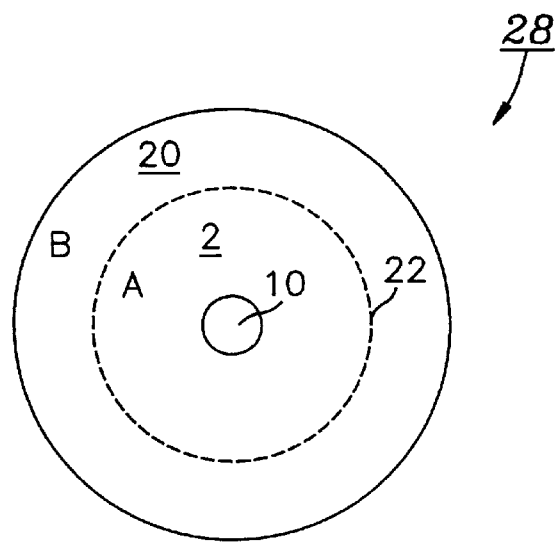
FIG. 2A is a cross-sectional view showing a final optical fiber preform prior to subjecting the final optical preform to a drawing process.

The first optical fiber preform is injected into a second substrate tube preform having a relatively large diameter to that of the first optical fiber preform. For example, the second substrate tube preform has an inside diameter of 21 mm and an outside diameter of 41 mm. Generally, the second substrate tube has the same natural material as that of the first optical fiber preform. Next, the second substrate tube is heated at about 2000° C. by means of a heating burner. At the same time, air in the space between first optical fiber perform and second substrate tube is extracted by a vacuum pump. As a result, the second substrate tube collapses onto and is fixed to the first optical fiber preform. The finally produced optical fiber preform has the structure shown in FIGS. 2A and 2B, and is used for extraction process of the optical fiber. FIG. 2A is a cross-sectional view of the final optical fiber preform 28 and FIG. 2B is a perspective view thereof.

Figure 2B:
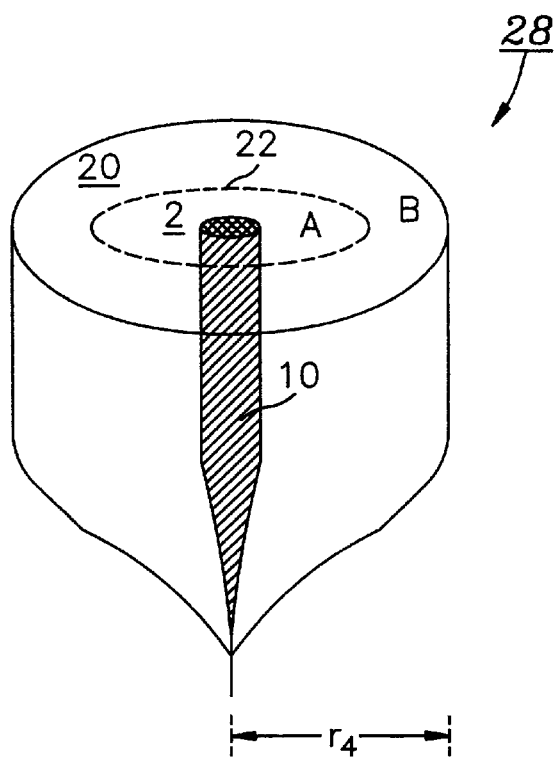
FIG. 2B is a perspective view showing the final optical fiber preform and the resulting final optical fiber due to a drawing process.

Referring now to FIGS. 2A and 2B, reference numeral 10 is a deposited layer formed by the MCVD method, which is constituted by a core and a clad, and reference numeral 2 is a first substrate tube (shown FIG. 1) used in the MCVD method and forms clad A. Reference numeral 20 is a second substrate tube used during over-cladding and forms clad B. Also, reference numeral 22 is an interface surface between clads A and B and is called an over jacket surface.

Clad A of first substrate tube 2 and clad B of second substrate tube 20 use a transparent quartz glass having the same property of material such as thermal conductivity or viscosity coefficient. Such a transparent quartz glass is relatively low in price and degree of purity, as compared to a synthetic quartz glass.

The final optical fiber preform 28, which is constituted by the first and second substrate tubes having the same degree of material, causes occurrence of optical loss due to refractive-index variations, and in particular, Rayleigh scattering loss caused during the extraction process. Rayleigh scattering in glass is the same phenomenon that disperses light from the sun in the atmosphere, thereby causing the sky to appear blue. As well-known in the art, Rayleigh scattering loss is caused because of (i) non-uniformity in interface between the core and the clad, (ii) non-uniformity of the germanium dioxide $GeO_2$ component in the core and (iii) variations of refractive index in accordance with a wavelength.

The extraction process of the optical fiber, to be described below, causes the optical loss under the conditions of the same material as that of the final optical fiber preform 28 and the same extraction as that of the preform 28.

Extraction process of the optical fiber will be described with reference to FIG. 3, which is a block diagram showing extracting steps.

Figure 3:
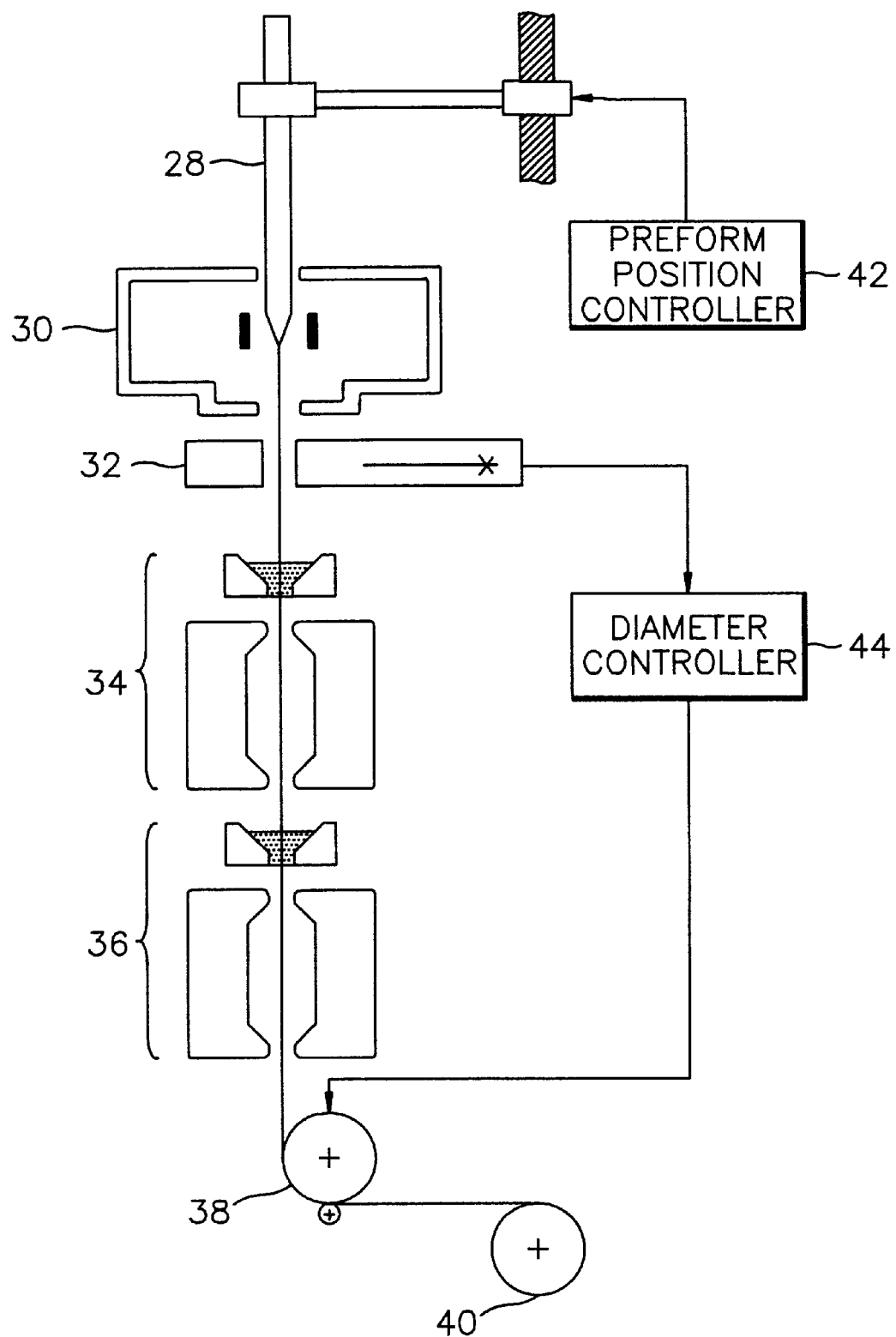
FIG. 3 is a schematic diagram showing the construction of an optical fiber drawing apparatus.

As shown in FIG. 3, the final preform 28 is slowly supplied to a furnace 30 by means of a preform positioning controller 42. Then, the final preform 28 is heated at a temperature of several thousand ° C., preferably in the range of about 2250° C. to 2300° C. By this heating process, the optical fiber is extracted from the final preform 28. Extraction force is supplied from a capstan 38 and applied to the un-coated optical fiber. Diameter detector 32 detects whether the diameter of the uncoated optical fiber is equal to a predetermined diameter, i.e 125 $\mu$m, or not. Detection signal from the diameter detector 32 is applied to the diameter controller 44 which makes sure the diameter of the un-coated optical fiber is maintained at the desired diameter. Capstan 38 is rotated to control extension force (drawing force) of the optical fiber in response to control of the diameter controller 44. In first and second coating units 34 and 36, the optical fiber is coated with a polymer coating material under the condition of a cooling state. The coated optical fiber extracted by the drawing force of the capstan 38 is rolled up by means of a take-up reel 40. The rotating speed of capstan 38 is about 20 m/sec and has a relatively high speed of during the drawing of the optical fiber.

Figure 4:
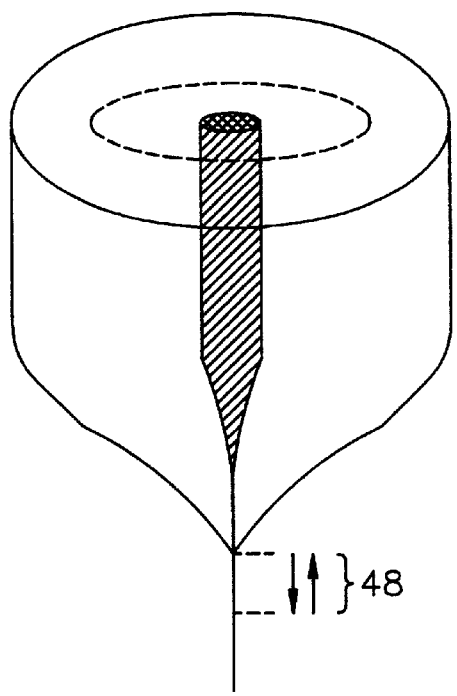
FIG. 4 is a diagram showing a neck down zone of the final optical preform developed during the drawing process.
Figure 7:
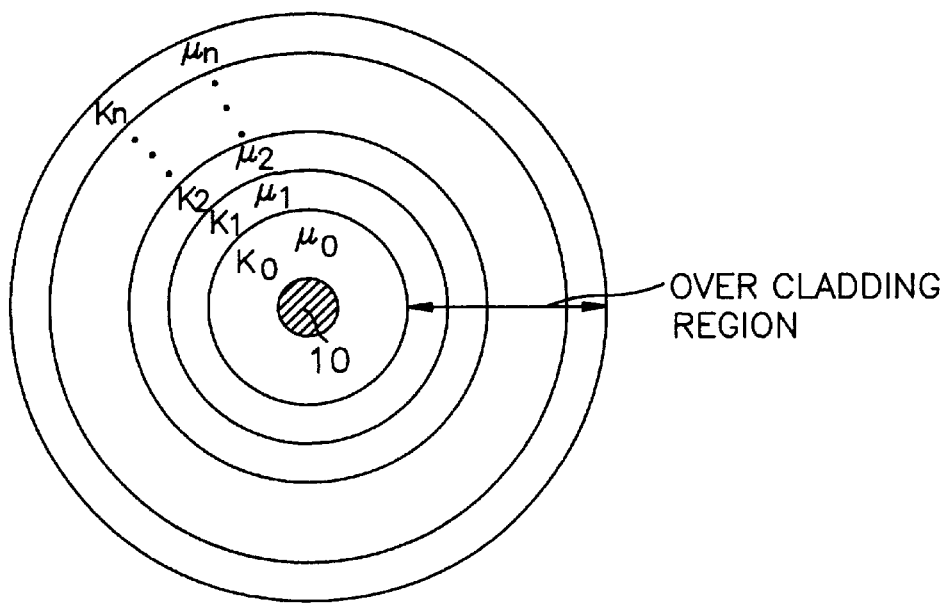
FIG. 7 is a cross-sectional view showing the final preform which is fabricated in accordance with the embodiment of the present invention.

In the above described extraction process, Rayleigh scattering loss is determined by the drawing conditions of the optical fiber, particularly, temperature, speed and extension. For example, high temperature and low extension force cause the Rayleigh scattering loss and UV absorption loss to be increased. Extension force of the capstan 38 and temperature in the furnace are provided to form a neck down zone, as shown by reference numeral 48 in FIG. 4, which is in the range of from a cross-section decreasing portion of the final optical fiber to a drawing portion of the un-coated optical fiber. The neck down zone 48 is shaped as shown in FIG. 4 because of the softening point of glass and the amount of heat applied thereto. Glass has a constant softening point, for example approximately 1750° C. for a transparent quartz tube and approximately 1600° C. for a synthetic quartz tube. If a temperature around the glass is more than the constant softening point, the glass varies from a solid state to a fluid state and is lowered in viscosity. In this state, the state varied glass is dropped down by gravity instead of the desired extension force to form the neck down zone 48 as shown in FIG. 4.

In the neck down zone 48 where the outside diameter of the optical fiber is about 125 μm, the core is most highly heated. Since the first and second quartz tubes have the same property of material in the final preform, variations of the neck down zone is serious. A case of serious variation in the neck down zone is when the temperature applied to the clad is equal to one applied to the core. In the extraction process of the optical fiber, the final preform of FIG. 2A has a relatively low temperature in clad 2 close to the central axis of the core as compared to the temperature in clad 20. However, since a difference between the temperatures in the clads 2 and is not significant when the two clads are of the same material, the temperature applied to the core is equal to the temperature applied to the cladding layers and a serious variation of the neck down zone is caused. The refractive index of the core or the clad is varied in accordance with a serious variation of the neck down zone, resulting in increased Rayleigh scattering loss, causing loss in the optical transmission efficiency. Consequently, in the final preform 28 of FIG. 2A, Rayleigh scattering loss is increased by serious variation of the neck down zone.

Also, the main component which increases refractive index of the core, germanium dioxide $GeO_2$ in particular, is ionized because of the high temperature (i.e. about 2150° C.) of the furnace during extraction of the optical fiber, and thus distribution of $GeO_2$ is not uniform thus increasing Rayleigh scattering loss.

In a letter entitled "Fluorine's effect on fiber optical losses induced by drawing", in the OFC '94 Optical Fiber Communication, Vol. 4, 1994 Technical Digest Series, Conference Edition by the Optical Society of America, it is disclosed that Rayleigh scattering loss is lowered by diffusing fluorine into a core. Since the fluorine is slightly dependent on a drawing temperature in the core and serves as a preventing element of ionization of germanium dioxide $GeO_2$ from the core.

According to the principles of present invention, to prevent germanium dioxide $GeO_2$ from being ionized from the core, a clad layer close to the central axis of the optical fiber has a most high temperature and thermal conductivity of the clad layer is lowered in accordance with the distance from the central axis. As a result, the temperature to be applied to the core during the extraction process of the optical fiber is low and therefore dissolution of germanium dioxide $GeO_2$ from the core can be prevented.

Distribution of material property according to the present invention allows the temperature of a core to be lowered, and thus an increase in optical loss is prevented.

In one embodiment of the principles of the present invention, two quartz tubes different in value of property of material are used to form a final preform. Clad 20 of a second quartz tube is made of a material having a relatively low thermal conductivity as compared to clad 2 of a first quartz tube. Since the thermal conductivity is physically in inverse proportion to viscosity coefficient, the clad 20 has relatively high viscosity coefficient as compared to clad 2. This relation can be described as follows:

K:clad 2>clad 20

μ:clad 2<clad 20 where, K is a thermal conductivity and μ is a viscosity coefficient.

Figure 5A:
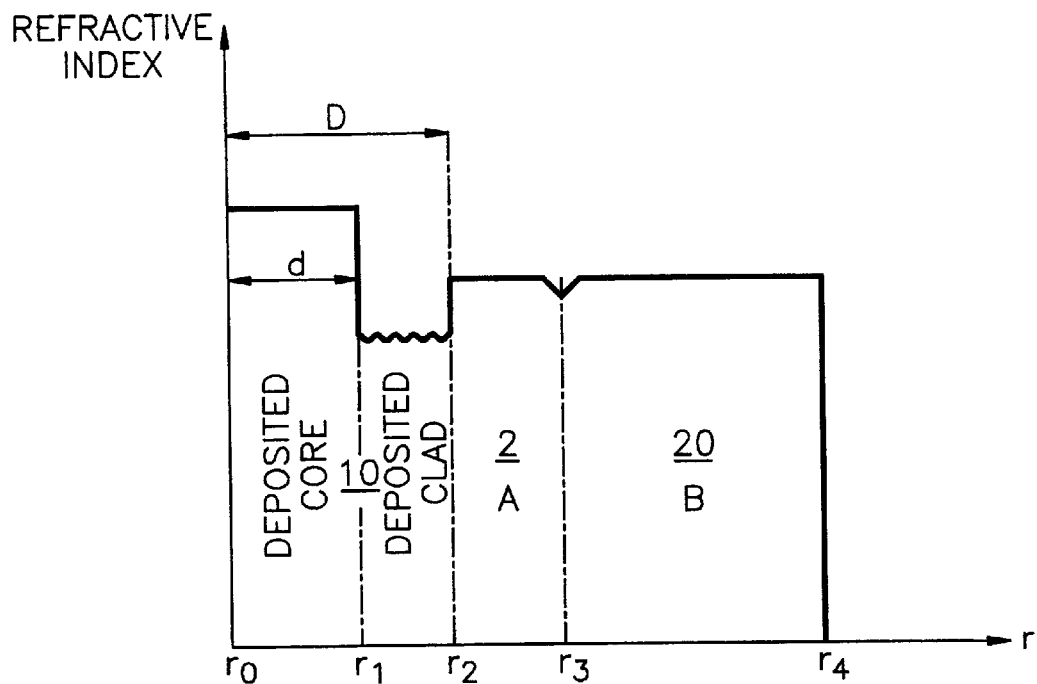
FIGS. 5A through 5C are diagrams showing relationship between thermal conductivity and temperature of the final preform.
Figure 5B:
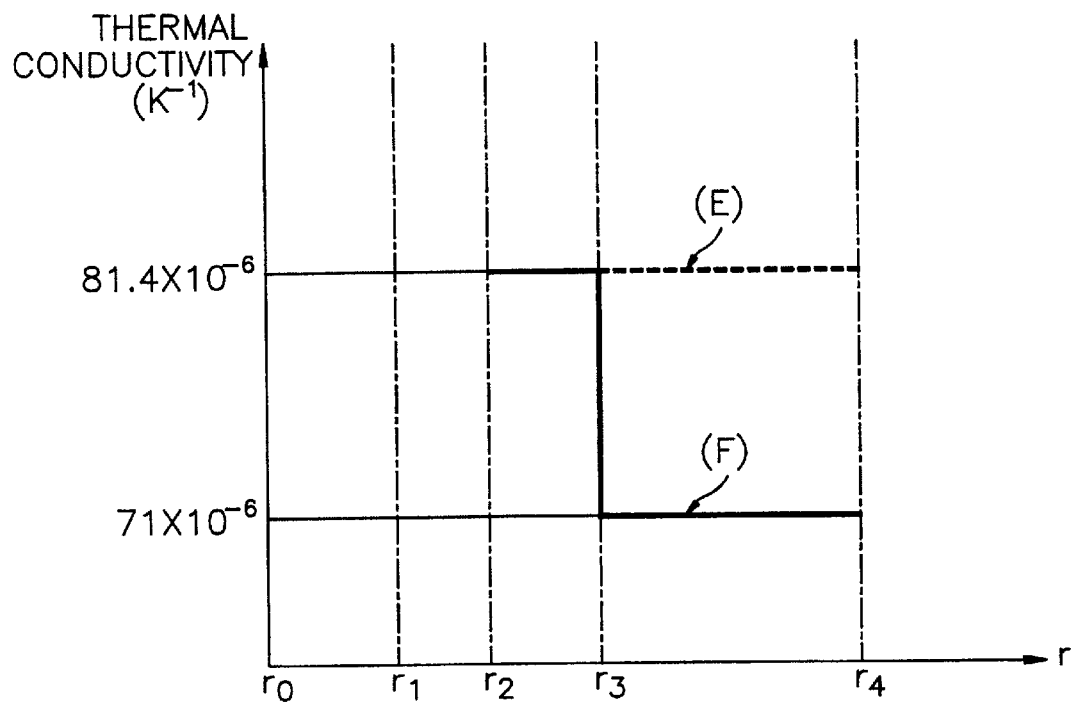
Figure 5C:
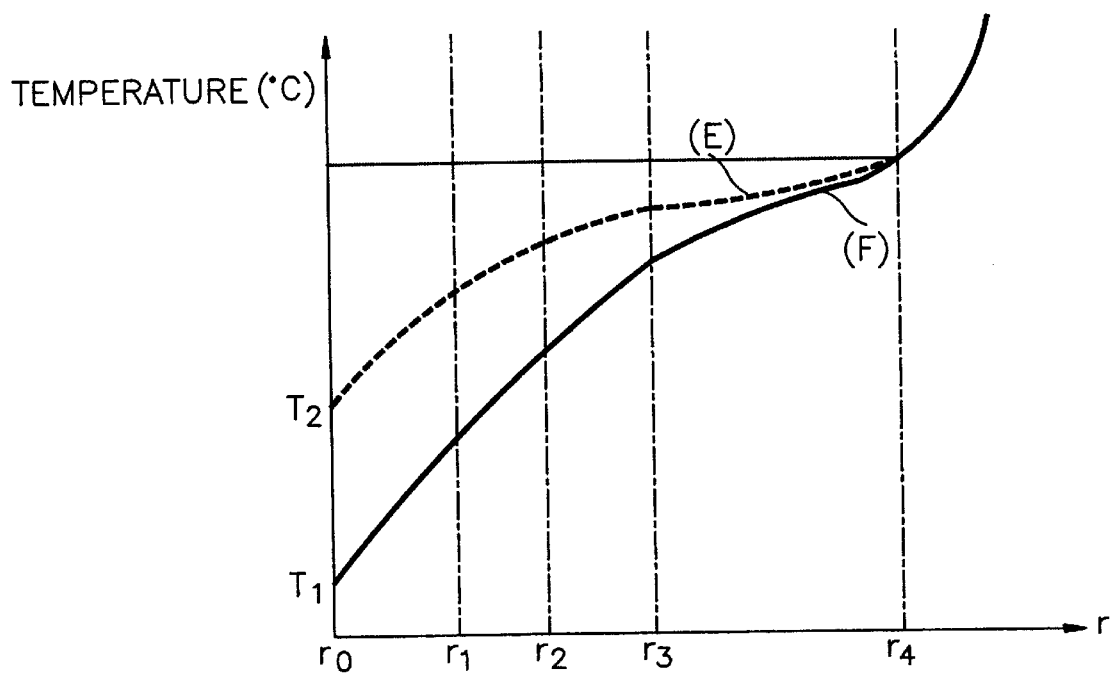

As a result, a value of material property in the final optical fiber preform 28 of the present invention satisfies F-curves as shown in FIGS. 5A, 5B and 5C.

FIGS. 5A–5C show variation of temperature of the core in accordance with a value of material property of the final preform 28, such as thermal conductivity and viscosity coefficient. In FIGS. 5A–5C, a horizontal axis indicates a radius of the final preform, $r_0$ is a central axis thereof, $r_1$ is a radius of a deposited core from the central axis, $r_2$ is a radius of a deposited clad from the central axis, $r_3$ is a radius of clad 2 from the central axis, and $r_4$ is a radius of clad 20 from the central axis.

As shown in FIG. 5A, when the first and second quartz tubes 2 and 20 of the final preform 28 have the same material properties as those of the conventional quartz tubes, the cross sectional area of the preform 28 has the thermal conductivity and temperature distribution indicated by E-curves in FIGS. 5B and 5C.

Next, when the first and second quartz tubes 2 and 20 have the material properties according to the present invention. That is, when the thermal conductivity K of the first quartz tube 2 is more than that of the second quartz tube 20 and the viscosity coefficient of the first quartz tube 2 is less than that of the second quartz tube 20, the cross sectional area of the preform 28 has the thermal conductivity and temperature distribution as shown by F-curves in FIGS. 5B and 5C.

The relation between temperature and thermal conductivity is disclosed in a book, entitled by "Heat Transfer" Seventh Edition, published by McGraw-Hill Book Co. pp. 151–155. It can be seen that graphs disclosed in the book have similar curves to those of FIGS. 5B and 5C.

FIG. 5C shows a temperature difference between T2 and T1 in the core of the deposited layer 10, where T1 is a temperature applied to the core of the optical fiber according to the present invention and T2 is a temperature applied to the core of the conventional optical fiber. This lower temperature T1 at the core of the optical fiber of the present invention prevents ionization of germanium oxide $GeO_2$ from the core.

A decrease in a scattering loss level in an optical fiber extracted or drawn at a minimum temperature is well known in the art. Thus, as shown in FIGS. 5B and 5C, the optical fiber according to the invention has an effect that a scattering loss thereof is lowered.

In the preferred embodiment of the present invention, a synthetic quartz tube is used as the first quartz tube 2 and a transparent quartz tube is used as the second quartz tube 20. The final preform 28 having the synthetic and transparent quartz tubes satisfies the temperature characteristics shown in FIG. 5A. In table (1) below, characteristics of the synthetic and transparent quartz tubes are described.

TABLE 1

|  | SYNTHETIC | TRANSPARENT |
| --- | --- | --- |
| THERMAL CONDUCTIVITY (K) | $81.4 \times 10^{-6}$ | $71 \times 10^{-6}$ |
| CONCENTRATION OF OH RADICAL | 5 ppm and less | 200 ppm |
| IMPURITY CONCENTRATION | low | high |
| PRICE | expensive | less expensive |

Figure 6:
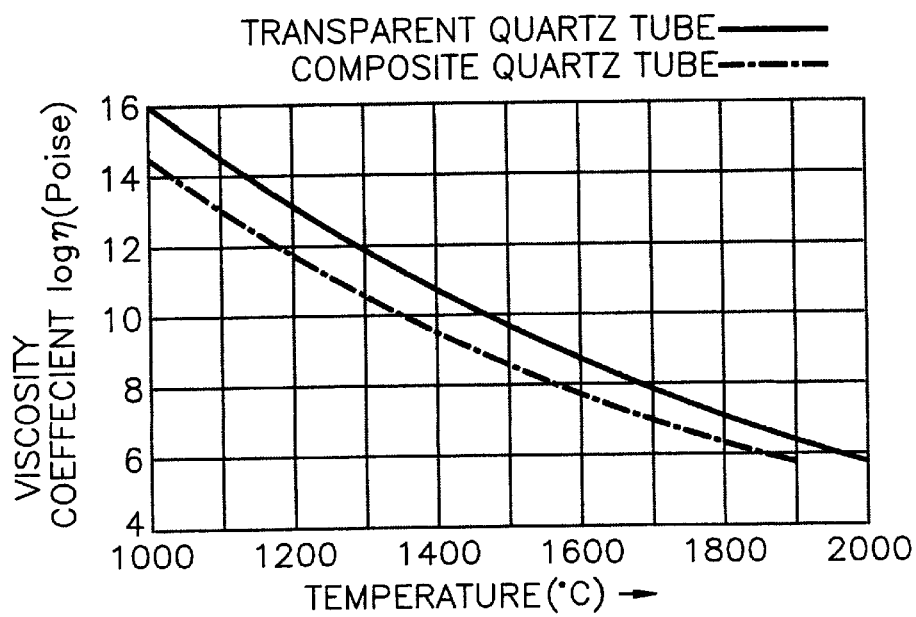
FIG. 6 is a diagram showing viscosity coefficients of transparent and synthetic quartz tubes with respect to temperature.

Also, with reference to a graph of FIG. 6, the relation between temperature and viscosity coefficient of the transparent and synthetic quartz tubes can be seen. In the graph of FIG. 6, the transparent quartz tube has higher viscosity than the synthetic quartz tube in the range of 1000°–2000° C.

In this embodiment, to use the synthetic quartz tube as the first quartz tube contributes to a reduced thickness of the clad of the deposited layer 10 shown in FIG. 5A. The deposited clad is a protective layer to prevent hydroxyl OH or metal impurity ions from penetrating into the core.

When a transparent quartz tube is used as first tube 2, the D/d ratio has to be preferably set to more than 7 so as to reduce loss of a light through absorption, where D is a radius of the deposited clad to the central axis and d is a radius of the deposited core to the central axis. When the synthetic quartz tube is used as the first tube 2, as in the present invention, the concentration of the hydroxyl OH— ions is reduced thus allowing the deposited clad, used as the protective layer, to be thinner than when a transparent quartz tube is used as first tube 2. A reduction in thickness of the deposited clad contributes to a lower production cost when using the MCVD method of deposition.

In production of the optical fibers, it is necessary to fabricate them by means of over cladding method (or, over jacket method) so as to produce a preform having a large caliber and obtain a good quality. Therefore, when the optical fiber is fabricated using the over cladding method, optical loss has to be reduced. To decrease the optical loss, the material properties such as thermal conductivity and viscosity coefficients have to be satisfied as follows:

THERMAL CONDUCTIVITY (K): $K_0 > K_1 > K_2 \ldots > K_n$

VISCOSITY COEFFICIENT ($\mu$): $\mu_0 < \mu_1 < \mu_2 \ldots < \mu_N$ where, 1, 2, . . . , n are over cladding times, and $K_0$ and $\mu_0$ are thermal conductivity and viscosity coefficient of first tube 2, respectively.

If a synthetic quartz tube is used as first tube 2, thermal conductivity of the composite 7 quartz tube has to be gradually lowered in accordance with the radial distance from the central axis of the synthetic quartz tube.

The thermal conductivity of the quartz tube is determined by concentrations of hydroxyl ion OH— and metal metal impurity ions, such as lithium Li, sodium Na, aluminum Al, iron Fe, copper Cu or the like. As the concentrations are further lowered, the thermal conductivity is increased. Accordingly, quartz tubes having different thermal conductivities, such as $K_0$, $K_1$, $K_2$ and $K_n$, can be made in accordance with the concentrations of the metal ion and hydroxyl ion. According to the method of the present invention, over cladding is performed to provide a plurality of quartz tubes having distribution of $K_0 > K_1 > K_2 \ldots > K_n$ in thermal conductivity radially outward from the central axis, and thus optical loss of the optical fiber is reduced. Then, since each thickness of the quartz tubes can be controlled by a manufacturer, a ratio of the core to the clad can be satisfied.

Therefore, according to an aspect of the present invention, an optical fiber preform is produced by forming a first quartz tube having a thermal conductivity $K_0$ and a first viscosity coefficient $\mu_0$, wherein the first quartz tube is to be used as a clad. A core layer and a clad layer are deposited inside the first quartz tube to form a preliminary perform by heating of the first quartz tube using the MCVD process. A second quartz tube having a second thermal conductivity $K_1$ which is lower than the first thermal conductivity $K_0$, and a second viscosity coefficient $\mu_1$ which is greater than the first viscosity coefficient $\mu_0$. The second quartz tube is placed over the preliminary preform and clad thereto by heating using a known over-cladding process to produce the final optical fiber preform. The final optical fiber preform produced by the foregoing process is used to manufacture an optical fiber having a core of a uniform refractive index known as a single-mode fiber.

The method of producing a final preform according to the present invention has essentially the same fabricating steps as those for producing a conventional preform except that the first quartz tube is a synthetic quartz tube and the second quartz tube is a transparent quartz tube. Additionally, the synthetic quartz tube will have an hydroxyl ion of 5 ppm or less, and the transparent quartz tube will have an hydroxyl ion of 200 ppm. Accordingly, there is no need for using an additional fabrication system. It is necessary to finely control the thickness of the clad deposited by the MCVD method. The final single mode preform has even characteristics over its full length.

According to a further aspect of the present invention, an optical fiber preform is produced by forming a first quartz tube having a thermal conductivity $K_0$ and a first viscosity coefficient $\mu_0$, wherein the first quartz tube is formed from a synthetic quartz tube an is to be used as a clad. A core layer and a clad layer are deposited inside the first quartz tube to form a preliminary perform by heating of the first quartz tube using the MCVD process. A second quartz tube having second through n thermal conductivity layers $K_1$—$K_n$ is formed by repeatedly over-cladding a preceding layer, wherein $K_0 > K_1 > K_2 \ldots > K_n$. Further, each layers viscosity coefficients $\mu_1$—$\mu_N$ varies such that $\mu_0 > \mu_1 > \mu_2 \ldots > \mu_N$. In other words, the second quartz tube is formed by placing a first transparent quartz tube having thermal conductivity $K_1$ and viscosity coefficient $\mu_1$ over the preliminary preform to be clad thereto by heating using a known over-cladding process. Then a second transparent quartz tube having thermal conductivity $K_2$ and viscosity coefficient $\mu_2$ is used to form a clad over the first transparent quartz tube. Thereafter, third through n transparent quartz tubes are clad over a preceding transparent quarts tube. The combination of the preliminary preform and the over-cladded second quartz tube result in the produced final optical fiber preform. The final optical fiber preform produced by the foregoing process is used to manufacture an optical fiber having a core of a uniform refractive index known as a single-mode fiber.

As above described, the present invention has an advantage that optical loss caused by drawing conditions of the optical fiber can be reduced because a cross sectional area of the preform has a gradient of thermal conductivity and a gradient of viscosity coefficient.

In addition, the optical fiber of the invention has even characteristics by distance and has an advantage that production cost is lowered because of enhanced yield.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An optical fiber preform comprising:
    a core having a uniform refractive index; and
    a clad surrounding said core, said clad exhibiting a gradient of varying thermal conductive clad layers, the clad layer closest to a central axis of said optical fiber preform having the highest thermal conductivity, and each clad layer farther out from said central axis than a preceding clad having a lower thermal conductivity than said preceding clad layer.

2. The preform according to claim 1, further comprising said clad layers gradiently varying in viscosity coefficient, said clad layer closest to said central axis of said optical fiber preform having the lowest viscosity coefficient, and each clad layer farther out from said central axis than a preceding clad having a higher viscosity coefficient than said preceding clad layer.

3. An optical fiber preform comprising:

a first quartz tube having a first thermal conductivity, said first quartz tube being used as a clad;

a core layer and a clad layer deposited inside said first quartz tube, said core layer having a uniform refractive index; and a second quartz tube having a second thermal conductivity lower than said first thermal conductivity, said second quartz tube being deposited over said first quartz tube.

4. An optical fiber preform as set forth in claim 3, said first quartz tube comprising a synthetic quartz tube.

5. An optical fiber preform as set forth in claim 3, said second quartz tube comprising a transparent quartz tube.

6. An optical fiber preform as set forth in claim 3, said first quartz tube comprising a synthetic quartz tube, and said second quartz tube comprising a transparent quartz tube.

7. An optical fiber preform as set forth in claim 3, said second quartz tube comprising a plurality of over-cladded transparent quartz tubes.

8. An optical fiber preform as set forth in claim 4, said synthetic quartz tube having a hydroxyl ion concentration of not more than five parts per million.

9. An optical fiber preform as set forth in claim 6, said second quartz tube comprising a plurality of over-cladded transparent quartz tubes.

10. An optical fiber preform as set forth in claim 9, said plurality of over-cladded transparent quartz tubes gradiently varying in thermal conductivity, the transparent quartz tube closest to a central axis of said optical fiber preform having the highest thermal conductivity, and each transparent quartz tube farther out from said central axis than a preceding transparent quartz tube having a lower thermal conductivity than said preceding transparent quartz tube.

11. An optical fiber preform as set forth in claim 9, said plurality of over-cladded transparent quartz tubes gradiently varying in viscosity coefficient, the transparent quartz tube closest to a central axis of said optical fiber preform having a lowest viscosity coefficient, and each transparent quartz tube farther out from said central axis than a preceding transparent quartz tube having a higher viscosity coefficient than said preceding transparent guartz tube.

12. An optical fiber preform comprising:

a first quartz tube having a first thermal conductivity, said first quartz tube being used as a clad;

a core layer and a clad layer, each being respectively deposited inside said first quartz tube;

a second quartz tube having a second thermal conductivity lower than said first thermal conductivity, said second quartz tube being deposited over said first quartz tube, said first quartz tube being heated after depositing said core and clad layers and prior to depositing said second quartz tube over said first quartz tube for forming a preliminary preform, said second quartz tube being heated after being deposited over said preliminary preform to form said optical fiber preform.

13. The optical fiber preform as set forth in claim 12, further comprising:

said first quartz tube being heated after depositing said core and clad layers and prior to depositing said second quartz tube over said first quartz tube for forming an preliminary preform; and said second quartz tube being heated after being deposited over said preliminary preform for over-cladding said optical fiber preform.

14. The optical fiber preform as set forth in claim 12 said second quartz tube comprising a thermal conductivity gradiently varied radially outward from said first quartz tube.

15. The optical fiber preform as set forth in claim 12, said second quartz tube comprising plural clad layers formed by over-cladding several times.

16. The optical fiber preform as set forth in claim 12, said second quartz tube comprising a plurality of successive clad layers formed radially outward from said first quartz tube, each successive one of said clad layers having a thermal conductivity less than a preceding clad layer.

17. The optical fiber preform as set forth in claim 12, said first quartz tube being comprised of a synthetic quartz tube.

18. The optical fiber preform as set forth in claim 12, said second quartz tube being comprised of a transparent quartz tube.

19. The optical fiber preform as set forth in claim 17, said synthetic quartz tube comprising a hydroxyl ion concentration of not more than five parts per million.

20. The optical fiber preform as set forth in claim 12, said first quartz tube being comprised of a synthetic quartz tube and said second quartz tube being comprised of a transparent quartz tube.

21. The optical fiber preform as set forth in claim 20, said synthetic quartz tube comprising a hydroxyl ion concentration of not more than five parts per million and said transparent quartz tube comprising a hydroxyl ion concentration of two hundred parts per million.

* * * * *